Aug. 10, 1965          H. C. FIELD ETAL          3,199,913
                       VEHICLE BODY SUNSHADE
Filed June 13, 1963                              2 Sheets-Sheet 1
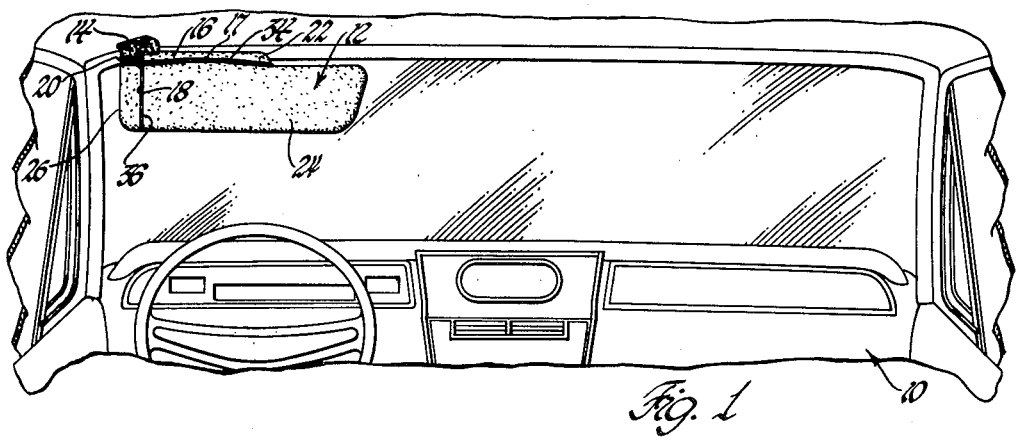
Fig. 1
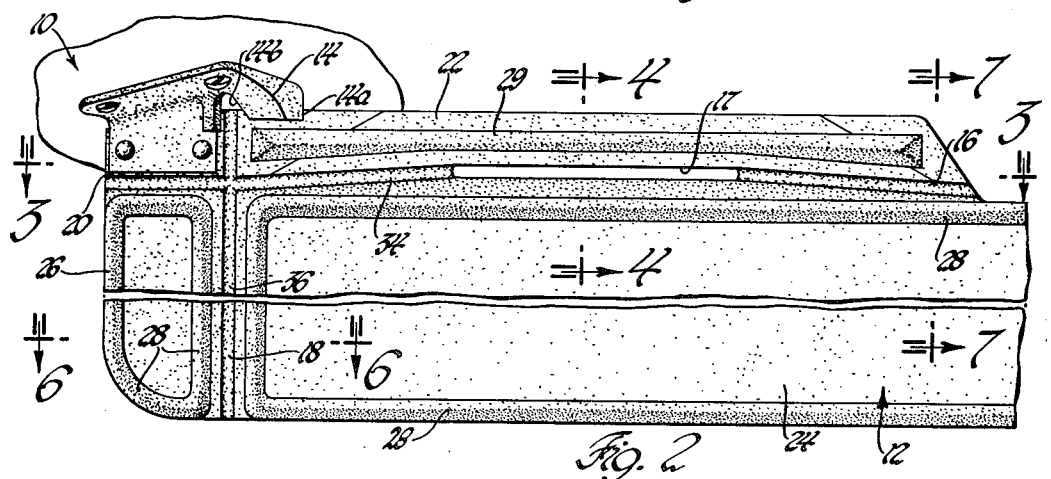
Fig. 2
Fig. 3
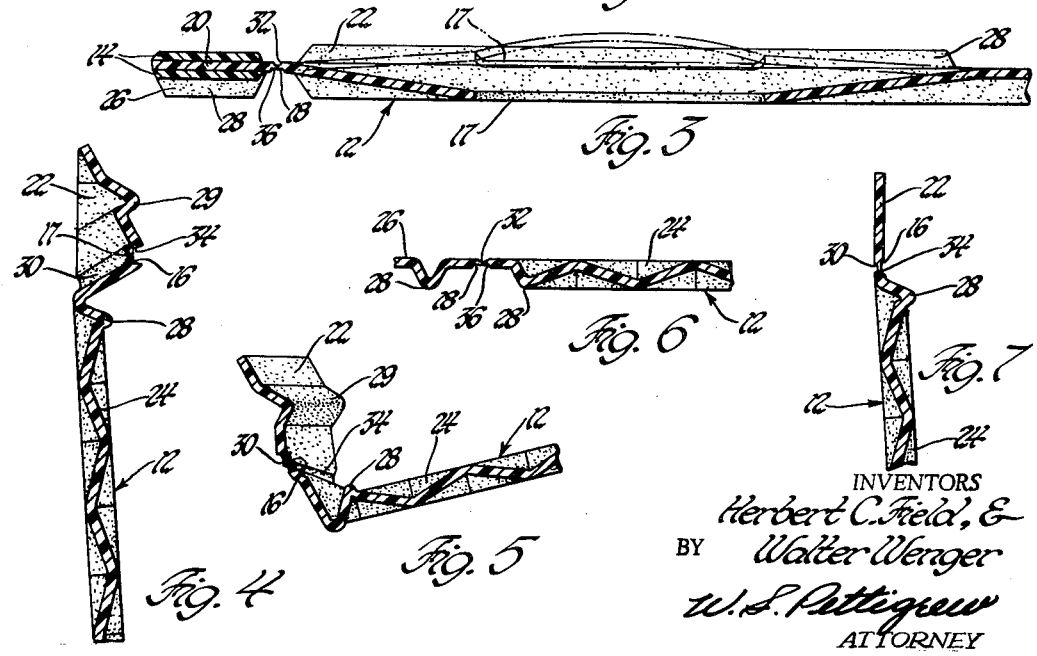
Fig. 4            Fig. 5            Fig. 6            Fig. 7
INVENTORS
Herbert C. Field, &
BY Walter Wenger
W. S. Pettigrew
ATTORNEY Aug. 10, 1965

H. C. FIELD ETAL 3,199,913

VEHICLE BODY SUNSHADE

Filed June 13, 1963

INVENTORS
Herbert C. Field, &
BY Walter Wenger
W. S. Pettigrew
ATTORNEY

United States Patent Office 3,199,913
Patented Aug. 10, 1965

3,199,913
VEHICLE BODY SUNSHADE
Herbert C. Field, Grosse Pointe, and Walter Wenger, Warren, Mich., assignors to General Motors Corporation, Detroit, Mich., a corporation of Delaware
Filed June 13, 1963, Ser. No. 287,539
2 Claims. (Cl. 296—97)

This invention relates to vehicle body sunshades and more particularly to a vehicle body sunshade including a plurality of integral hinges therein.

One feature of this invention is that it provides a new and improved vehicle body sunshade. Another feature of this invention is that it provides a vehicle body sunshade fabricated of a material suitable for the forming therein of a plurality of integral hinges or swingly interconnecting portions of the sunshade for movement with respect to each other. Still another feature of this invention, in one embodiment thereof, is that the integral hinges are so arranged as to provide integral snap-action means to hold the interconnected portions of the sunshade in a plurality of predetermined positions with respect to each other.

These and other features and advantages of the invention will be readily apparent from the following specifications and drawings wherein:

FIGURE 1 is a perspective view of the interior of a vehicle body including a sunshade according to one embodiment of this invention, with the sunshade being shown in an operative extended position;

FIGURE 2 is an enlarged view of a portion of FIGURE 1;

FIGURE 3 is a sectional view taken generally along the plane indicated by line 3—3 of FIGURE 2;

FIGURE 4 is a sectional view taken generally along the plane indicated by line 4—4 of FIGURE 2;

FIGURE 5 is a view similar to FIGURE 4 showing the sunshade in an inoperative retracted position;

FIGURE 6 is a sectional view taken generally along the plane indicated by line 6—6 of FIGURE 2;

FIGURE 7 is a sectional view taken generally along the plane indicated by line 7—7 of FIGURE 2;

Figure 8:
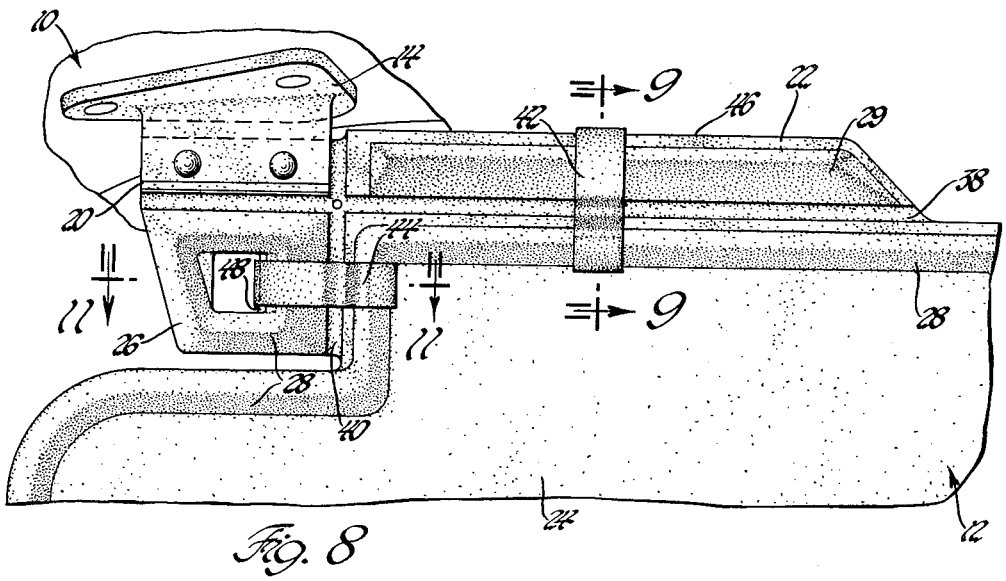
FIGURE 8 is a view similar to FIGURE 2 showing another embodiment of a sunshade according to this invention, with the sunshade being shown in an operative extended position.

Referring now particularly to FIGURES 1 and 2 of the drawing, a vehicle body 10 is provided with an interior sunshade 12 according to one embodiment of this invention which is mounted on the body header by a mounting bracket 14. Sunshade 12 is formed of a sheet of suitable flexible plastic material, such as polypropylene, having the characteristics of high flex life, high tensile strength, and high elongation beyond yield. In addition, sunshade 12 is of sufficient thickness so as to be substantially rigid and self-sustaining as to form.

Referring now to FIGURE 2, the sunshade 12 includes a generally horizontally extending groove 16 slotted at 17 and intersecting a vertically extending groove 18 to define four sunshade portions 20, 22, 24 and 26. Mounting bracket 14 is bifurcated to receive and be secured to portion 20. As shown best in FIGURES 4 and 6, portions 24 and 26 are formed with continuous ribs 28 around their respective edges and adjacent the grooves 16 and 18 to stiffen these portions against bending. A deep rib 29 stiffens portions 22.

As shown best in FIGURES 4 and 6, another pair of grooves 30 and 32 is formed on the reverse surface of sunshade 12 respectively opposite grooves 16 and 18 to provide therewith a pair of generally orthogonally intersecting integral hinges 34 and 36. As seen in FIGURE 2, with portion 20 being mounted on the vehicle body, portions 24 and 26 are vertically swingable as a unit about hinge 34 with respect to the vehicle body independently of portions 20 and 22, and portions 22 and 24 are horizontally swingable about hinge 36 with respect to the vehicle body independently of portions 20 and 26.

Integral snap-action holding means are provided in association with hinge 34 for maintaining the vertically swingable portions 24 and 26 either in an operative extended position, FIGURES 1 and 2, or an inoperative retracted position, FIGURE 5. Referring now to FIGURES 3, 4, 5 and 6, those areas of portions 22 and 24 immediate to hinge 34 and between ribs 28 and 29 are formed with a permanent outwardly bowed or generally arcuate shape in both horizontal and vertical section, such curvature having an imaginary chord line extending between the termination of hinge 34 at the right edge of portion 22 and the intersection of hinge 34 with hinge 36, with the high point of the curvature over the chord being located approximately at the mid-point of slot 17 in hinge 34. When portions 24 and 26 are swung about hinge 34 to the retracted inoperative position adjacent the vehicle roof, a snap-action effect will be produced. The result is illustrated in FIGURE 4 and in broken lines in FIGURE 3, wherein hinge 34 has moved overcenter to a position wherein the hinge is inwardly bowed relative to the chord line of the hinge. This movement produces a compression within the material immediately surrounding the opposite ends of hinge 34 exerting a force along the chord line which will yieldably maintain the portions 24 and 26 against movement overcenter back to the outwardly bowed curvature shown in FIGURE 4.

If it is desired that the sunshade be moved to a position adjacent the door window, portion 24 may be grasped and swung about hinge 36, to carry portion 22 therewith and move it out of a detent notch 14a provided in bracket 14 and into engagement with a detent notch 14b of the bracket to releasably hold the sunshade adjacent the door window. As shown in FIGURE 2, both detent notches are provided with a sloping cam surface aiding forced movement of portion 22 out of the notches.

Figure 9:
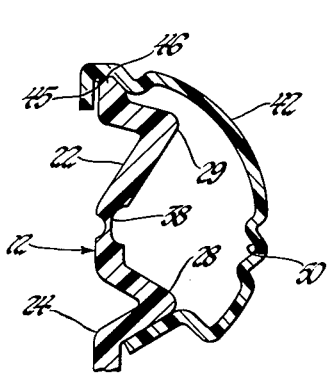
FIGURE 9 is an enlarged sectional view taken generally along the plane indicated by line 9—9 of FIGURE 8.
Figure 11:
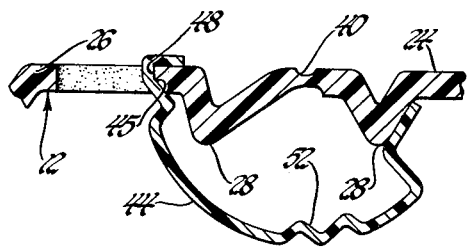
FIGURE 11 is an enlarged sectional view taken generally along the plane indicated by line 11—11 of FIGURE 8.
Figure 10:
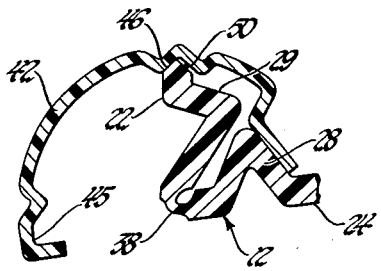
FIGURE 10 is a view similar to FIGURE 9 showing the sunshade in an inoperative retracted position.
Figure 12:
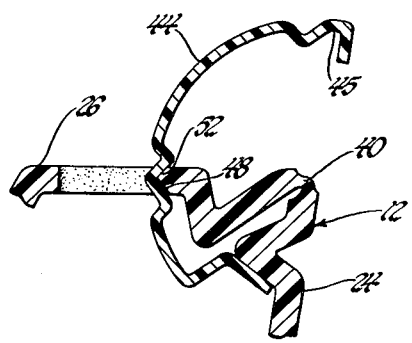
FIGURE 12 is a view similar to FIGURE 11 showing the sunshade in a different position.

In the embodiment shown in FIGURES 8 through 12, wherein like numerals refer to like parts, sunshade 12 is provided with integral hinges 38 and 40, which are both formed by grooves in the opposite surfaces of the sunshade. A pair of resilient detent members 42 and 44 fabricated of plastic material similar to that of the sunshade are heat-welded at one end to portion 24 and extend over the hinges 38 and 40 respectively to hook over an edge 46 of portion 22 and an edge 48 of an aperture in portion 26. As shown in FIGURES 9 and 11, the bights of the free hooked ends 45 of the members 42 and 44 engage the edges 46 and 48 to provide a stop to locate the movable portions of the sunshade in the operative extended position shown in FIGURE 8.

If it is desired that portions 24 and 26 be located in a retracted position adjacent the vehicle body roof, portions 24 and 26 are swung upwardly about hinge 38 until a notch 50 in member 42 engages edge 46, as shown in FIGURE 9, to yieldably hold the sunshade in this position. Similarly, if it is desired that portions 22 and 24 be located adjacent the door window, the portions are swung about hinge 40 until a notch 52 of detent 44 engages edge 48 of portion 26, as shown in FIGURE 11.

Although the method of forming integral hinges forms no part of this invention, we have found that, at this time, materials such as polypropylene are best suited for such an application, due primarily to their high flex life. Selection of such a material for fabricating the sunshade will insure that the integral hinges formed therein will not readily fracture upon repeated flexing thereof, thus providing for long life.

Thus a new and improved vehicle body sunshade is provided.

We claim:

1. A vehicle body sunshade, comprising, a sheet of flexible material including a pair of grooves each extending between opposite edges of said sheet, said grooves generally orthogonally intersecting with each other to define four portions of said sheet, each of said grooves providing an integral hinge swingably interconnecting a pair of portions on one side thereof with a pair of portions on the other side thereof for movemet of said pairs of portions relative to each other, said sheet including a bowed portion adjacent at least one of said grooves providing integral overcenter snap action means operable to resiliently releasably hold one of said pairs of portions respective to said one groove in a selected overcenter position relative to the other pair of said portions respective thereto, and means for mounting said sheet on a vehicle body whereby said snap action means is operable to hold said one pair of portions in a selected overcenter position relative to said other pair of portions and the vehicle body.

2. A vehicle body sunshade, comprising, a generally rectangular sheet of flexible material including a pair of grooves each extending between opposite edges of said sheet, said grooves generally orthorgonally intersecting with each other to define four portions of said sheet and being generally parallel the edges of said sheet, each of said grooves providing an integral hinge swingably interconnecting a pair of portions on one side thereof with a pair of portions on the other side thereof for movement of said pairs of portions relative to each other, means for mounting one of said portions on a vehicle body, said sheet including a portion adjacent the longer of said grooves and bowed outwardly of the plane of said sheet to provide integral overcenter snap action means operable to resiliently releasably hold one of said pairs of portions respective to said longer groove in a selected overcenter position relative to the other pair of portions respective thereto, and means for releasably holding one of said pairs of portions respective to the shorter of said grooves in a selected position relative to the other of said pairs of portions respective thereto.

References Cited by the Examiner

UNITED STATES PATENTS

| 1,981,702 | 11/34 | Jacobs | 296—97 |
| 2,070,208 | 2/37 | Kelly | 296—97 X |
| 2,746,790 | 5/56 | Fleming | 296—97 |
| 2,832,558 | 4/58 | Lange | 296—97 X |
| 2,842,395 | 7/58 | Davis | 296—97 |
| 3,019,486 | 2/62 | Stinson | |

A. HARRY LEVY, *Primary Examiner.*

UNITED STATES PATENT OFFICE
CERTIFICATE OF CORRECTION

Patent No. 3,199,913　　　　　　　　　　　　August 10, 1965

Herbert C. Field et al.

It is hereby certified that error appears in the above numbered patent requiring correction and that the said Letters Patent should read as corrected below.

Column 1, line 16, for "or swingly" read -- for swingably --; column 2, line 4, for "portions" read -- portion --; column 4, line 3, for "orthorgonally" read -- orthogonally --.

Signed and sealed this 25th day of January 1966.

(SEAL)
Attest:

ERNEST W. SWIDER　　　　　　　　　　　　EDWARD J. BRENNER
Attesting Officer　　　　　　　　　　　　Commissioner of Patents